May 6, 1958 R. G. J. MOODY 2,833,579
SAFETY DEVICE FOR MOTOR VEHICLE DOORS
Filed July 31, 1957
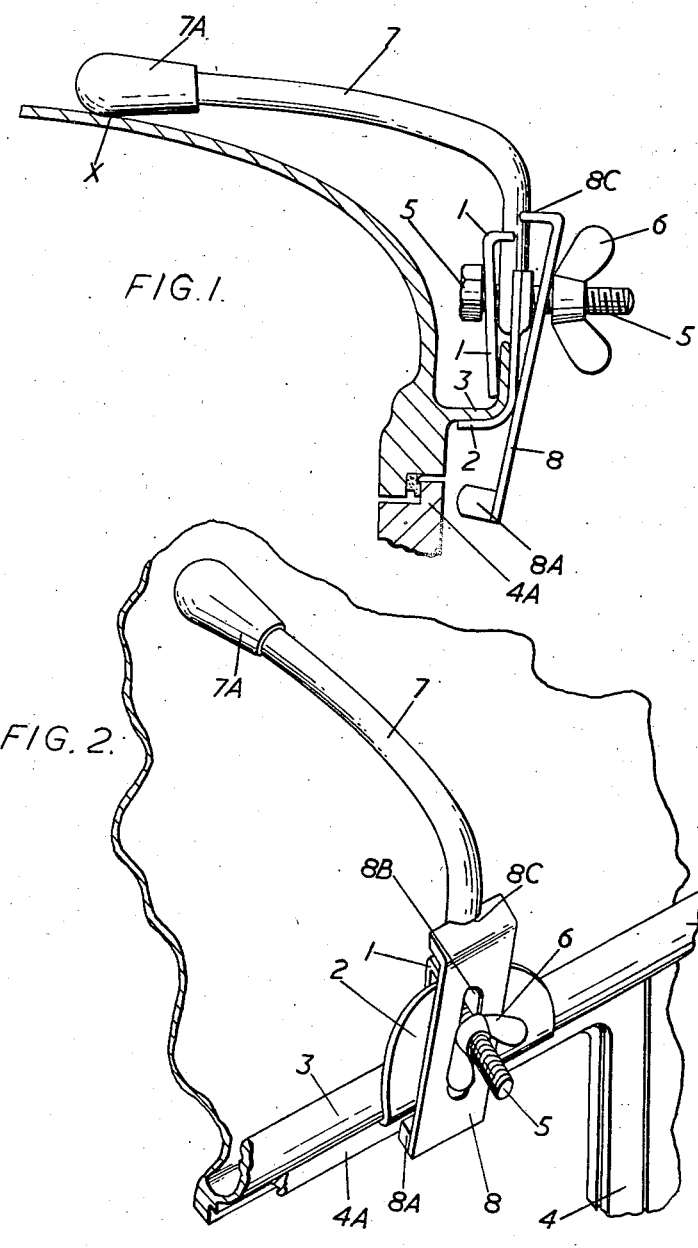
Inventor
RONALD G. J. MOODY
By William R. Liberman
Attorney

United States Patent Office 2,833,579
Patented May 6, 1958

2,833,579

SAFETY DEVICE FOR MOTOR VEHICLE DOORS

Ronald G. J. Moody, Bulawayo, Southern Rhodesia

Application July 31, 1957, Serial No. 675,508

4 Claims. (Cl. 292—288)

This invention relates to motor vehicle doors and provides a device by which such a door may be safely secured against accidental opening when the vehicle is in motion, and by which accordingly it is possible to eliminate the risk of children or other passengers falling out of the vehicle, with serious and often fatal consequences. The device is one which is readily fitted, as required, to car bodies of the ordinary designs having a hard top or roof, is as easily removed and stowed away when not required, and is moreover capable of being made available at low cost to encourage its wide adoption by motorists in the interests of road safety.

According to the invention a safety device as above indicated comprises a clamp securely attachable to the vehicle roof gutter above a door which is to be secured against opening, a member associated with the clamp and extending sufficiently downwardly from it to present an obstruction preventing the door from opening, and an arm rigidly connected with the clamp so as to extend generally upwardly therefrom and inwardly into contact with the surface of the roof above the gutter to resist distortion of the gutter under loads which may be applied to the clamp by engagement of the door with the obstruction.

More particularly, and preferably, the clamp comprises a pair of jaws and the arm is rigidly connected with one of the jaws and extends from it generally upwardly and inwardly over the clamp, as attached to the gutter, to embrace the adjacent region of the roof above the gutter and to bear near its free end upon such roof region through a pad or the like of material inhibiting damage to the roof surface, the member which provides the obstruction consisting of a lever pivotally or articulatably associated at an intermediate point in its length with the clamp, having its upper end adapted to bear inwardly upon the arm when its lower end, suitably cushioned if desired, lies opposite the upper rail of the closed door.

Where the obstruction-providing member is a lever, as in the immediately preceding paragraph, it may be turned round or otherwise displaced about its pivotal connection with the clamp so as to lie out of line with the door top and thus rendered inoperative, so permitting the door to be opened, and this without need of detaching the device as a whole and subsequently refitting it when the door is to be secured again. Furthermore such a preferred arrangement enables differences in the shapes and/or dimensions of the roof, gutter and door opening from one vehicle to another to be more readily accommodated without corresponding alterations to the device, so that the latter can be more or less standardised for installation on a wide range of different makes or styles of vehicles.

If desired the clamping means may be associated with a key-actuated or other lock in such a way as to prevent the device from being tampered with or rendered inoperative unintentionally.

The invention, in a convenient embodiment, is illustrated in the accompanying drawings wherein:

Figure 1 is an elevation of the device as installed, and

Figure 2 is a perspective view corresponding to Figure 1.

In these drawings, the clamp consists of the two steel or other strong metal plate jaws 1 and 2 adapted to be applied to the inside and the outside respectively of the car roof gutter 3 above the door 4 and to be tightened into position by the through bolt 5 and wing nut 6.

Integral with, or rigidly connected as by welding to the upper part of the jaw 2 is a stout steel or like arm 7 which extends, as shown, upwardly from the jaw 2, over the jaw 1 and the gutter in suitably bowed form so as to be contactable, in a rubber or other soft material pad 7a, with a point x of the roof well removed from the gutter when the clamp has been affixed to the gutter as indicated.

The obstruction or stop which, when the device is operative, is positioned more or less closely to the outside of the upper rail 4a of the door, consists of a rubber or other such pad 8a attached at one end of a stout steel or like plate lever 8 which is provided with an elongated hole 8b in the region of its centre through which hole the clamp bolt 5 passes to the wing nut.

The upper extremity of the lever 8 is turned inwardly and notched as at 8c to fit snugly, as shown, against the lower region of the arm 7 to provide a fulcrum for the lever when the clamping nut is operated to tighten the jaws together and at the same time to draw the lower end of the lever and the pad 8a inwardly. The slotted hole enables the lever to be raised or lowered before tightening up the clamp so that the lever pad or obstruction 8a may be correctly positioned for either obstructing the opening of the door or allowing the same to be used in the ordinary way. Alternatively to render the device inoperative the lever can be released from its fulcrum engagement through the notched upper end with the arm, turned into a horizontal position and secured thus by retightening the wing nut.

The invention is not limited to the specifically disclosed construction but on the other hand extends to any construction or modification falling within the scope of the preceding more general paragraphs and the appended claims. Thus, for instance, the member whereof a part provides the door-rail engageable stop or obstruction need not be a lever or other such part separate from the clamp, but may if desired be effectively integral therewith, more particularly integral with the armed part of the clamp. Also, as already indicated locking means may be included in the device.

I claim:

1. A safety device to secure the door of a motor vehicle against accidental opening, said motor vehicle having a gutter extending lengthwise of the vehicle body over the door, said device comprising a clamp including a pair of jaws securely attached to the vehicle roof gutter above the door to be secured against opening, a member associated with said clamp and including a lever pivotally secured at a point between the ends thereof to said clamp and extending sufficiently downwardly to prevent the opening of said door, an arm rigidly connected to one of said jaws and extending generally upwardly therefrom and inwardly to embrace the adjacent region of the roof of said vehicle above said gutter and to bear adjacent its free end upon said roof, said member having its upper end adapted to bear inwardly upon said arm when its lower end lies opposite the upper rail of the closed door.

2. A device in accordance with claim 1, wherein said lever is selectively movable into positions in and out of alignment with the path of movement of said door.

3. A device in accordance with claim 2, wherein said arm is of bowed configuration and carries a pad adjacent its free end adapted to engage said vehicle roof.

4. A device in accordance with claim 2, wherein one end of said lever has a notch formed therein to register with said arm and the opposite end of said lever defines the door stop.

References Cited in the file of this patent

UNITED STATES PATENTS 2,564,600     Hummer _____ Aug. 14, 1951